United States Patent [19]

Sudani et al.

[11] Patent Number: 4,874,564
[45] Date of Patent: Oct. 17, 1989

[54] MOLDING PROCESS AND DEVICE THEREFOR

[75] Inventors: Kiyoshi Sudani; Yoshihiko Sunami, both of Kashima, Japan

[73] Assignee: Sumitomo Metal Industries, Ltd., Osaka, Japan

[21] Appl. No.: 134,057

[22] Filed: Dec. 17, 1987

[30] Foreign Application Priority Data

Dec. 18, 1986 [JP] Japan ................................ 61-302345
Mar. 3, 1987 [JP] Japan ................................ 62-048294

[51] Int. Cl.⁴ ...................... B29C 43/18; B29C 43/36; B29C 43/52
[52] U.S. Cl. ..................................... 264/24.7; 264/63; 264/66; 264/137; 264/258; 264/324; 264/327; 264/DIG. 46; 264/DIG. 65; 425/398; 425/411; 425/415; 425/DIG. 110
[58] Field of Search ................. 264/29.7, 64, 66, 137, 264/258, 320, 324, 325, 327, DIG. 65, 63, DIG. 46; 425/398, 411, 415, 420, 812, DIG. 110

[56] References Cited

U.S. PATENT DOCUMENTS

| | | | |
|---|---|---|---|
| 2,550,687 | 5/1951 | Goss | 264/327 X |
| 3,009,863 | 11/1961 | Angevine | 264/29.7 |
| 3,504,065 | 3/1970 | Edstrom | |
| 3,734,797 | 5/1973 | Byers | |
| 3,790,650 | 2/1974 | Heier | 264/327 X |
| 3,932,568 | 1/1976 | Watts et al. | 264/29.7 |
| 4,185,055 | 1/1980 | Barrilon et al. | 264/29.7 X |
| 4,353,782 | 10/1982 | Lersmacher | 264/29.7 X |
| 4,417,872 | 11/1983 | Christner et al. | |
| 4,613,473 | 9/1986 | Layden et al. | 264/258 X |
| 4,745,008 | 5/1988 | Plotzker et al. | 264/29.7 X |

FOREIGN PATENT DOCUMENTS

| | | |
|---|---|---|
| 86384 | 8/1983 | European Pat. Off. |
| 2430720 | 1/1976 | Fed. Rep. of Germany |
| 2144329 | 2/1973 | France |
| 2300053 | 9/1976 | France |
| 58-45923 | 3/1983 | Japan ................................ 264/258 |
| 58-156512 | 9/1983 | Japan ................................ 423/449 |
| 59-185617 | 10/1984 | Japan ................................ 264/327 |
| 61-188130 | 8/1986 | Japan ................................ 264/327 |
| 618298 | 8/1978 | U.S.S.R. ................................ 264/258 |

Primary Examiner—Jeffery Thurlow
Assistant Examiner—Leo B. Tentoni
Attorney, Agent, or Firm—Burns, Doane, Swecker & Mathis

[57] ABSTRACT

A molding process of a molding compound containing an ingredient such as a binder, e.g., pitch or a thermosetting resin which generate gas before being set, is disclosed, wherein the molding compound is heated and molded under pressure according to a special temperature pattern. First, the molding compound may be preheated substantially uniformly to a temperature at which the binder melts and generates reaction gas. Next, temperature gradient in the direction of thickness of the molding is created while raising the temperature of the molding to an upper limit temperature so that the setting of the molding progressively advances from the higher temperature to the lower temperature side of the molding.

16 Claims, 4 Drawing Sheets

MOLDING PROCESS AND DEVICE THEREFOR

BACKGROUND OF THE INVENTION

1. Field of the Invention

The present invention relates to molding processes for molding compounds which contain as a binder or other ingredient a material which is cured or solidified upon heating with evolving gas by heating the molding compound under pressure in a mold. The present invention also relates to molding devices for use in such molding processes.

2. Description of the Prior Art

In recent years, resinous moldings and fiber-reinforced resinous composite materials have come to be widely used in everyday commodities and industrial components. More recently, carbon fiber reinforced carbon composite materials, or carbon-fiber/carbon composite materials (C/C materials), have attracted attention as materials especially suited for space-craft or air-craft components, automobile components, and medical equipment.

The above-mentioned resinous moldings and fiber-reinforced resinous composite materials are usually produced by a process in which a molding compound or composition containing a thermosetting resin as a binder is molded by the application of heat and pressure. In the production of carbon-fiber/carbon composite materials, a precursor material, obtained by a molding process, is carbonized and sometimes graphitized. The precursor of the carbon-fiber/carbon composite material is produced by molding a molding compound containing a thermosetting resin or a pitch (e.g. coal tar pitch) as a binder. In the case in which pitch is used, the pitch-containing molding compound is molded into precursor moldings by heating the molding compound, under a compressive force, to the solidifying or setting temperature (about 500° C.) of the pitch. The solidifying or the setting of the binder due to heat is referred to hereinafter as the setting of the binder.

However, the production of moldings of larger dimensions by the above-mentioned processes was difficult for the following reasons. When the molding compound is heated to a high temperature in the mold, the thermosetting resin or the pitch present in the compound as the binder generates a gas and water vapor before it is set to form moldings. Thus, if the generated gas accumulates in the middle portion of the molding and remains therein during the setting stage of the binder, laminar fractures are formed therein. If, on the other hand, the generated gas remains scattered over the whole volume of the molding during the setting stage of the binder, gas bubbles are left in the molding. When the thickness of the moldings is large, it is difficult for the generated gas to escape from the interior of the molding. Thus, moldings of larger thicknesses tend to include fractures or bubbles therein.

A more specific mechanism of the laminar fracture formation in the middle portion of the molding along the thickness thereof is as follows. FIG. 1 schematically shows the setting stage of the molding compound 4a, 4b, and 4c in a metallic mold, which comprises a frame 1 having a vertical bore 1a extending therethrough, and upper and lower dies or punches 2 and 3 slidably inserted in the bore 1a. The molding compound 4a, 4b, and 4c including pitch or a thermosetting resin as a binder is heated and pressed by the upper and lower punches 2 and 3. For the purpose of effecting uniform setting of the compound, the upper and lower punches 2 and 3 are heated by sheathed heaters to equal temperatures at the surfaces thereof contacting the molding compound. It is inevitable, however, that the temperature varies along the thickness of the molding compound, i.e., along the vertical direction in the figure. That is, the temperatures of the regions 4a near the surfaces which are in contact with the punches 2 and 3 become higher than that of the middle portion 4c along the thickness thereof. Thus, at the early setting stage of the molding shown in FIG. 1, the regions 4a of the molding compound near the contact surfaces thereof are already set, the next regions 4b which are closer to the middle of the thickness of the molding are highly viscous, being just before the setting stage, and the middle region or portion 4c of the molding is still molten and of relatively low viscosity. The entirety of the middle molten portion 4c actively generates reaction gas. As the molten portion 4c has a relatively low viscosity, the generated gas can move within portion 4c relatively easily. The high viscosity regions 4b and the set regions 4a, however, are hardly capable of allowing the gas to pass therethrough, and the gas generated in the middle portion 4c can hardly escape therefrom. Thus, the gas tends to accumulate in the middle portion 4c of the molding. The thickness of the molten middle portion 4c grows thinner as the setting of the compound advances. Therefore, a large quantity of gas is finally accumulated in the middle portion of the molding at the final setting stage thereof. As a result, the middle portion of the molding, which becomes of high porosity and of low strength, is split by the springing-back action of the molding or by the gas pressure to form laminar fractures therein when the compressive force P is removed.

The conventional method for preventing the troubles resulting from the generation of gas during the setting of the molding compound is the degassing procedure. In this procedure, the compressive force against the molding is occasionally removed during the molding process to air the gas accumulated in the molding. However, this degassing is not very effective at removing the gas from the molding and it is difficult to prevent the occurrence of the troubles resulting from the generation of the gas in the molding compound during the setting thereof, especially in the case of moldings having large dimensions.

SUMMARY OF THE INVENTION

Thus, a primary object of the present invention is to provide a method of molding a molding compound including a binder which, when subjected to heat, generates reaction gas before losing plasticity and being set into solid moldings, wherein the formation of fractures or bubbles in the molding can reliably be prevented, especially in the case of moldings having large dimensions.

Another object of the present invention is to provide a molding method in which a molding compound is selected which is best suited for the molding process and the respective applications of the product.

A further object of the present invention is to provide a molding device which is best suited to the molding method according to the present invention.

According to the present invention, a molding compound or mixture of molding materials is first prepared. The molding compound includes an additive such as a binder which, when subjected to heat, first melts and generates gas before it is cured or set.

Next, after being poured or put into the mold, the thus-prepared molding compound is heated and pressed in the mold to a temperature sufficient to cause setting of said additive while creating a temperature gradient along the direction of the compressive force, thereby progressively advancing setting of said molding compound from one end of the molding compound which is at a higher temperature to the opposite end which is at a lower temperature. Such a heat pattern eliminates or minimizes the danger of the formation of the above-mentioned fractures or bubbles in the molding.

In an embodiment, the molding compound may be preliminarily heated, under no or relatively small compressive force, to a temperature level which is sufficient to melt the binder and generates gas but which is not sufficient to cause setting of the binder At this stage, substantially uniform heating may be effected throughout the mold.

Next, preferably after keeping the compound at said temperature level for enough length of time to ensure substantial uniformity of the temperature along the thickness of the molding, the compound is further heated, under a compressive force, to a higher temperature level which is sufficient to cause setting of the binder. At this stage, however, a temperature difference is created between the temperatures at two end surfaces of the molding, i.e., the surfaces which are situated at the opposite ends along the direction of compressive force, usually the direction of the thickness of the molding. The compound is usually heated by the heaters provided in upper and lower punches slidably inserted into a frame. In such cases, the temperature difference can be created by controlling the temperatures of the upper and lower heaters so as to be at different levels. Due to the temperature difference at the two end surfaces of the molding along the thickness thereof, a temperature gradient is created along the thickness. Thus, curing or setting of the compound advances progressively from the end surface having the higher temperature to the opposite end surface having the lower temperature along the thickness of the molding compound. As a result, high viscosity regions of low airing efficiency are not formed at the end surface having a lower temperature until the final stage of the setting in which the temperature of the molding at the lower temperature side is raised to a level substantially equal to that at the higher temperature side, and the setting of the compound is finished. The gas generated in the molten region of the compound escapes through the end surface having a lower temperature to the exterior of the mold. Thus, stable and reliable molding is realized with a minimum danger of laminar fracture formation or bubbles inclusion. The temperature gradient created during the setting stage of the compound does not adversely affect the uniformity of the portions of the molding along the thickness thereof.

The thus-formed molding is cooled and removed from the mold. Usually, the molding is further carbonized and possibly graphitized to obtain the finished product.

Preferably the material which generates gas before setting, e.g., the binder comprises pitch. In preferred embodiments, the molding compound may comprise, beside pitch, carbon powder, or carbon powder and carbon fiber. In still other embodiments, the molding compound may comprise, beside pitch, carbon or graphite powder, and metal fiber. Other preferred examples of the molding compound are specified in the appended claims and the detailed description of the preferred embodiments.

When the molding compound comprises pitch as a binder, the contraction of the mold during the cooling stage thereof may result in a formation of fractures in the moldings. Thus, according to another aspect of the present invention, a molding device which is specifically adapted to the molding process of the molding compound including pitch as a binder is provided. That is, the mold frame of the molding device according to the present invention is made of an INVAR-type alloy.

BRIEF DESCRIPTION OF THE DRAWINGS

Further details of the invention are described below with the help of examples, while referring to the attached drawings in which.

DETAILED DESCRIPTION OF THE PREFERRED EMBODIMENTS

First, a molding device suitable for performing the molding process according to the present invention will be described.

Figure 1:
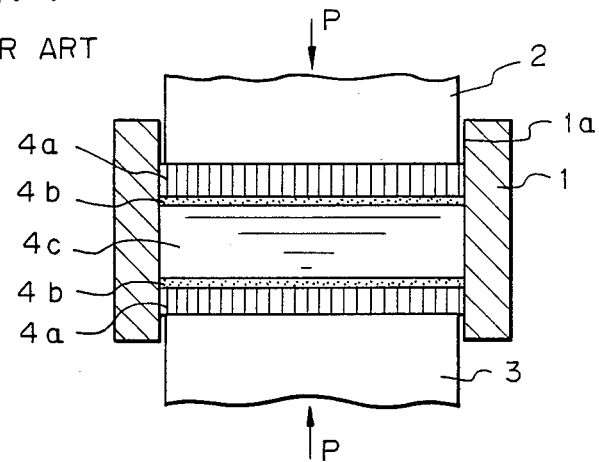
FIG. 1 is a schematic sectional view of a conventional molding device during a molding process.
Figure 2:
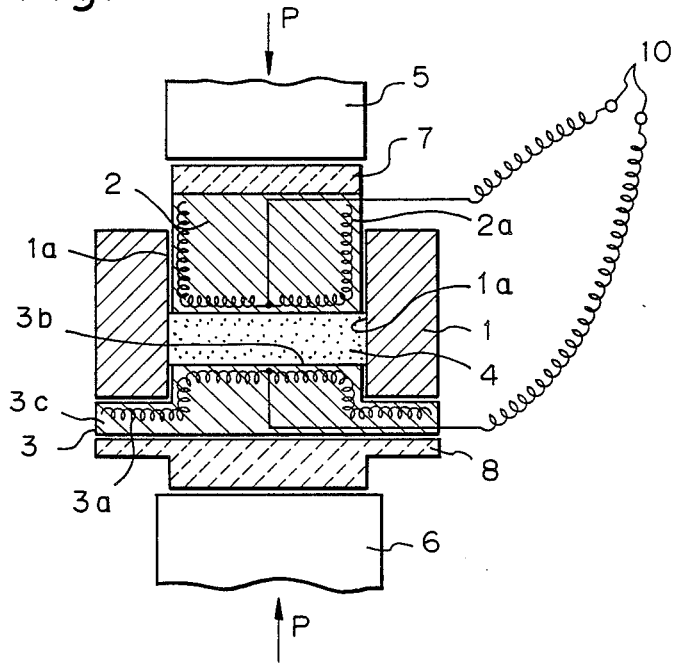
FIG. 2 is a sectional view of a molding device according to the present invention in elevation.

FIG. 2 shows a cross-sectional view of an embodiment of the molding device according to the present invention. A cylindrical mold frame 1 having a central cylindrical bore 1a extending vertically therethrough is made of an INVAR-type alloy. More specifically, the mold frame 1 has an outer diameter of 500 millimeters, an inner diameter of 300 millimeters, and a height of 100 millimeters, and is made, for example, of 36.5Fe-54Co-9.5Cr INVAR alloy. An upper die or punch 2, having the form of a solid cylinder, and a lower die or punch 3, having a disk-shaped flange or base portion 3c and a solid cylindrical projection 3b integral therewith are slidably inserted into the central bore 1a of the mold frame 1 from above and below, respectively. Both punches 2 and 3 are made of carbon steel and define a space within the bore 1a of the frame 1 in which a molding compound 4 is poured or put when the molding process is begun.

The upper and lower punches 2 and 3 are connected to upper and lower press-heads 5 and 6, respectively, through upper and lower heat insulating members 7 and 8, which are made of asbestos-reinforced cement. Furthermore, the upper and lower punches 2 and 3 are provided with respective sheathed heaters 2a and 3a, which are controlled by a control unit (not shown). The temperatures of the upper and lower punches 2 and 3 at the surfaces thereof which contact the molding compound 4 are measured by thermocouples 10, which are embedded in the upper and lower punches 2 and 3, respectively.

The molding device of FIG. 2 has a mold frame 1 made of an INVAR-type alloy, and is suitable for molding a molding compound including pitch as binder, as explained hereinbelow.

Figure 3:
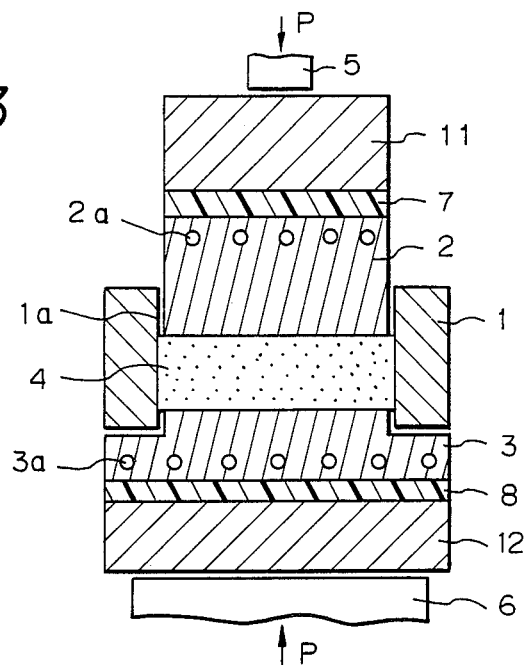
FIG. 3 is a view similar to that of FIG. 2, but showing another molding device according to the present invention.

FIG. 3 shows another embodiment of the molding device according to the present invention. The device shown in this figure has a structure similar to that of the device of FIG. 2 except for certain minor differences. Namely, the mold frame 1 has the form of a rectangular column and has a longitudinally-extending rectangular bore 1a. The four outer sides of the rectangular cross section of the mold frame 1 are 400 millimeters in length; the four inner sides of the cross section of the frame 1, i.e., the four sides of the rectangular cross section of the bore 1a, are 300 millimeters in length. The height of the frame 1 is 80 millimeters. Sheathed heaters 2a and 3a of the upper and lower punches 2 and 3 are shown in cross section. Upper and lower pressure leveling boards 11 and 12 are inserted between the upper and lower press-heads 5 and 6 and the upper and lower heat insulating members 7 and 8, respectively. Otherwise, the device of this figure is similar to that of FIG. 2, although thermocouples are not shown in FIG. 3.

Figure 4:
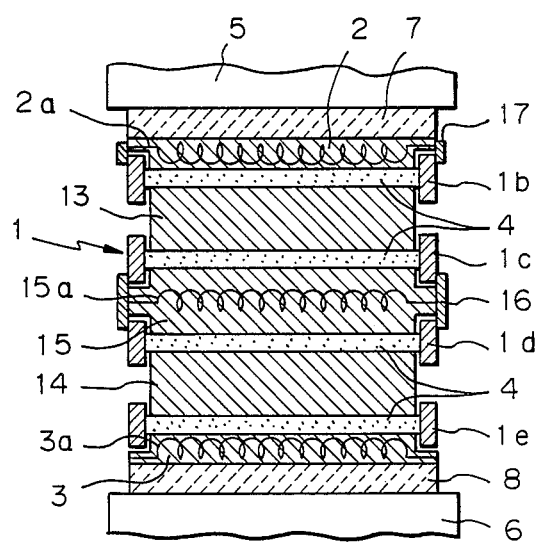
FIG. 4 is also a view similar to that of FIG. 2, but showing still another molding device according to the present invention which is capable of molding a plurality of moldings simultaneously.

FIG. 4 shows another device according to the present invention which is similar to the device of FIG. 2 but is capable of molding a plurality of moldings simultaneously. In the device of this figure, the mold frame 1 is divided into four sections 1b, 1c, 1d, and 1e. Furthermore, outer frames 16 and 17 are provided on the outside of the mold frame sections 1b, 1c, and 1d. Section 1b is slidable within outer frame 17. Sections 1c and 1d, on the other hand, are connected by and slidable within outer frame 16. Furthermore, upper and lower middle punches 13 and 14 are provided, and are slidable within mold frame sections 1b and 1c, and sections 1d and 1e, respectively. A middle punch 15 has upper and lower disk-shaped projections which slidably fit into sections 1c and 1d, respectively. The molding compound 4 is divided into four molding portions which are sandwiched between the upper punch 2 and the upper middle punch 13, between the upper middle punch 13 and the middle punch 15, between the middle punch 15 and the lower middle punch 14, and between the lower middle punch 14 and the lower punch 3. The middle punch 15a is provided with sheathed heaters 15a to facilitate the control of the temperatures of the molding portions 4 along the thickness thereof. Otherwise, the device is similar to that of FIG. 2.

According to the molding method of the present invention, a molding compound is first prepared by mixing an additive such as a binder with other molding materials in the form of powders or fibers.

The binder, which generates gas before setting, may be pitch such as coal-tar pitch, a phenol resin such as novolak, and coal, especially coking-coal.

Examples of the molding materials in the form of a powder or fiber which are mixed into the molding compound together with the binder include the following:

carbon powder such as coke powder (which includes coal coke powder, pitch coke powder, and oil coke powder), graphite powder, and carbon black, i.e., a finely divided form of carbon obtained, for example, by the incomplete combustion of petroleum oil;

ceramic powder such as alumina powder and silica powder;

metal powder such as iron powder;

carbon fiber; and metal fiber such as steel fiber.

Preferred combinations of the binder and the powder and/or fiber materials which are mixed together to form the molding compound include the following three classes:

pitch, coke powder, and carbon fiber;

pitch and coke powder; and pitch, carbon powder such as graphite or coke powder with a possible addition of ceramic powder, and metal fiber such as steel fiber.

In these three types of combinations of ingredients of the molding compound, pitch is preferred to be included in the compound within a range of 15 to 30 percent by volume. If the amount of pitch is below 15 percent by volume, the binder effect of pitch is insufficient. If, on the other hand, the amount of pitch exceeds 30 percent by volume, the viscosity of the molding compound is insufficient to hold the molding compound within the mold.

In the last-mentioned combination of pitch, graphite powder and metal fiber, the percentage by volume of pitch is preferred to be from 15 to 40 and more preferred to be from 20 to 30, that of graphite not less than 5, and that of metal fiber from 5 to 50. This combination is especially suited to be used in the molding process to obtain frictional members which are to be used in disk brakes of automobiles, etc., as explained below.

By and large, conventional frictional materials for disk brakes were resinous materials which comprised asbestos as the primary component together with other additives and a phenol resin as the binder, and which were molded by the application of heat and pressure. Recently, however, the carcinogenic property of asbestos has become a matter of public concern, so that research has been performed to develop frictional materials for brakes which are free of asbestos. Thus, semimetallic-type frictional materials have been developed which are produced by a molding process through the application of heat and pressure upon a molding compound comprising fiber or powder metal as the main component together with other additives and a phenol resin as the binding material.

Although the material is semimetallic, it is a molded material using phenol resin as the binding material, and the temperature at which phenol resin shows heat resistance is at most 250° to 300° C. Thus, in cases in which the temperature of the frictional material of the brakes become high, such as during high-load braking, high-speed braking, and frequent braking, a great increase in the abrasion or a decrease in the frictional coefficient of the frictional member resulted.

Frictional materials comprising aramid or glass fiber as the primary component have also been developed recently. These materials, however, also use a phenol resin as in the case of the conventional frictional materials, so that they are not immune to the problem of abrasion at high temperatures.

On the other hand, carbon-fiber/carbon composite materials have found application in recent years in disk brakes for airplanes and racing automobiles. A carbon-fiber/carbon composite material is a kind of composite material which consists of carbon fibers and a carbon matrix. In the case of this material, good frictional performance can be attained only when both the disk and the frictional member are made of carbon-fiber/carbon composite material. However, a carbon-fiber/carbon composite material is expensive, and is weaker than iron with regard to impact stresses. Thus, it is not suitable to be used in general-purpose automobiles such as trucks, buses, and passenger vehicles, in which good reliability for a long period is required. Furthermore, the combination of an iron disk and a frictional member of a carbon-fiber/carbon composite material does not give good frictional characteristics and is not suited for disk brakes of general-purpose automobiles.

On the other hand, a material which is obtained by molding a molding compound including pitch, metallic fiber, and graphite as the primary component materials is suited to be used as a frictional member of iron disk brakes of general-purpose automobiles. That is, due to the usage of carbon as the binding material, this material has high heat resistance, and shows good resistance against abrasion above 400° C., where conventional frictional materials show a great increase in the amount of abrasion.

The preferred percentage by volume of the components of this combination of materials has been specified above. The pitch used in this combination of materials is preferred to have fluidity from the viewpoint of adhering fibrous materials and other additives. Furthermore, for the purpose of obtaining a high rate of carbonization and high strength, pitch including a low percentage of volatile components, and more specifically not more than 30 percent, is preferred.

The preferred percentage of the pitch in the material is, as specified above, 15 to 40 percent by volume, and more preferably 20 to 30 percent by volume. When the percentage of pitch is below the above specified lower limit, the adhesive force thereof become too low. When, on the other hand, the percentage of pitch exceeds the above-specified upper limit, the strength and the abrasion resistance of the material are reduced.

The preferred percentage by volume of metallic fiber is, as specified above, 5 to 50. The role of the metallic fiber is to improve the abrasion resistance and increase the frictional coefficient of the moldings obtained by molding the molding compound. The addition of the metallic fiber is very effective for improving these characteristics.

Examples of metallic fiber include steel fiber and copper fiber. However, soft steel fiber is preferred because of its low level of reaction with the pitch during carbonization process and also because of the great improvement in the abrasion resistance which it provides. When the added amount of the metallic fiber is less than 5 percent by volume, the improvement in the abrasion resistance is small. When, on the other hand, the metallic fiber is added in an amount of more than 50 percent by volume, the moldability of the compound become inferior so that the abrasion resistance of the molding obtained from the compound is greatly decreased. Thus, the amounts of the metallic fiber outside the range specified above are not preferred.

Another primary ingredient material, graphite powder, has the effect of forming a lubricant layer between the frictional member and the disk, so that the abnormal abrasion of the frictional member is reduced. Examples of graphite include natural and synthetic graphite. The particle size of the graphite powder is not subject to specific limitations, and graphite powder of from about 1 millimeter down to a few micrometers can be used in the molding compound. The amount of graphite powder, however, should be not less than 5 percent by volume to ensure the reduction of abnormal abrasion.

This combination of ingredients comprising pitch, metallic fiber, and graphite powder as the primary components may include other additive ingredient materials. For example, a ceramic powder such as alumina powder may be added for the purpose of increasing the frictional coefficient, or coke powder or carbon fiber may be added for the purpose of increasing the strength of the moldings obtained from the molding compound.

As described above, this combination of ingredients results in a frictional member which is excellent in abrasion resistance in a high temperature range and which has a consistently high frictional coefficient as compared with conventional frictional members such as semimetallic-type frictional members having a phenol resin as the binding material. This is because in the material obtained from this combination of ingredients, carbon, which has very high heat resistance, is used as the binding material.

An example of the molding compound of this combination is obtained by mixing the following ingredients:

24 percent by volume of pitch obtained from coal tar by heat treatment and having a softening point of 280° C.;

30 percent by volume of soft steel fiber having a fiber length of 3 millimeters and a square fiber cross section of 50 micrometers on a side;

26 percent by volume of synthetic graphite having a mean article size of 10 micrometers; and 20 percent by volume of scale-shaped natural graphite powder smashed to a particle size of not more than 16 mesh.

The combination of ingredient materials mentioned hereinabove, pitch, carbon powder, and carbon fiber, is suitable for producing a carbon-fiber/carbon composite material, which has excellent performance when used as a material for rocket nozzles, disk brakes for airplanes, or heat-generating carbon members.

A carbon-fiber/carbon composite material is lightweight and has high strength and good heat resistance. Thus, this material is now indispensable for the production of spacecraft and airplane components, heat generators, and medical equipment. The general method of production thereof which is adopted today is as follows. First carbon fiber and a thermosetting resin or pitch is mixed, and the resulting mixture is then molded and carbonized. However, the adoption of this method for the production of a carbon-fiber/carbon composite material often resulted in the formation of a great number of bubbles in the moldings obtained after the carbonization process. Thus, it has often been necessary to alternate the treatment of the pitch impregnation and that of carbonization, or to effect the chemical vapor deposition of carbon, for the purpose of obtaining high-density products.

On the other hand, it has recently been reported that a high-density and high-strength carbon-fiber/carbon composite material can be obtained by the following process (Digest of 11th Annual Meeting of Carbon Material Society (Tanso Zairyo Gakkai), pp. 98–99). Namely, carbon fiber and a mixture of carbon powder and pitch having a high softening temperature are stacked alternately, and then the pile obtained by this stacking process is molded by the application of heat and pressure, thereby obtaining a high-density and high-strength carbon-fiber/carbon composite material without treatments for obtaining high density such as pitch immersion or chemical vapor deposition of carbon. Even by this process, however, the bending strength of the carbon-fiber/carbon composite material is at most about 800 kg/cm$^2$, which is not enough to satisfy the demands now made on carbon-fiber/carbon composite materials.

Thus, although carbon-fiber/carbon composite materials are attracting attention as light-weight high-strength materials, there are strong demands for improvements of the physical properties and the method of production thereof.

The carbon-fiber/carbon composite material which is produced from the molding compound according to the molding process which is described hereinbelow answers these demands. The carbon powder included in the molding compound may be coke powder, graphite powder, or carbon black, all of which have been used in the production of conventional carbon-fiber/carbon composite materials. The particle size of the carbon powder is no subject to specific limitation. However, a particle size of more than 20 micrometers results in easier formation of cracks in the matrix of the moldings formed by the carbon powder and the pitch. Thus, carbon powder having a particle size of not more than 20 micrometers is preferred. For example, carbon powder falling primarily in the particle size range of from 5 to 15 micrometers is preferred.

In this combination of ingredient materials, pitch is used as the binder, because pitch is advantageous in that the carbonization ratio thereof is higher than that of thermosetting resins. The type of pitch used as the binder in the molding compound is not critical. However, pitch containing a lower percentage of volatile matter produces a higher yield of carbonization, so that pitch containing not more than 30 percent volatile matter is preferred from this point of view. On the other hand, from the viewpoint of adhesion of carbon fiber and carbon powder, pitch having good softening properties and good fluidity is preferred, so that pitch containing not less than 15 percent volatile matter is preferred from the point of view of softening properties and fluidity.

The preferred pitch, i.e., pitch containing from 15 to 30 percent volatile matter, can be obtained from coal-tar pitch or petrolic pitch by heat treatment at a temperature not less than 350° C. under a reduced pressure.

The carbon fiber present in the combination may be any one of high-quality or general-purpose carbon fibers. It is not necessary to limit the carbonization temperature of the carbon fiber to a level not less than the general carbonization temperature of carbon fiber, i.e., 1000° C. It suffices to use a carbon fiber having a carbonization temperature of from 500 to 1000° C. It often happens that the products carbonized in this lower temperature range have a higher strength, because of the tendency of the carbon fibers to contract during the carbonization process of the molding at these low temperatures. This results in a smaller difference in the contraction rate between the carbon fiber and the matrix of the molding. Thus, the carbonization temperature of the carbon fiber is selected according to the properties required of the product material. The carbon fiber may be of chopped or woven form, and is not subject to specific limitations with regard to its form. However, although the woven form of carbon fiber result in products which have higher strength in the alignment direction of the fiber of the fabric, they are highly anisotropic in their properties. Thus, for some applications, the chopped form of carbon fiber, which facilitates the mixture of the ingredient materials, is preferred.

The fiber diameter of the carbon fiber of this combination of ingredients is not subject to specific limitation; however, it is preferred to be from 5 to 20 micrometers. Furthermore, carbon fiber is usually bundled into a thread by a sizing agent such as an epoxy resin. However, if the carbon fiber is used together with the sizing agent, the sizing agent solidifies during the heating process to make the immersion of the pitch into the carbon fiber bundle difficult. Furthermore, the sizing agent results in the existence of foreign material on the interface between the pitch and the carbon fiber. Thus, it is preferred that the sizing agent be removed from the carbon fiber before the carbon fiber is mixed into the molding compound.

The carbon powder, pitch, and carbon fiber as described above can be mixed together by the usual dry mixing procedure. The molding compound can also be prepared by first mixing carbon powder and pitch, and then alternately stacking the mixture thus obtained with the carbon fiber, thereby obtaining the molding compound in the form of a stacked or laminated material.

The molding compound including this combination of pitch, carbon powder, and carbon fiber may be prepared by mixing the following components:

50 percent by volume of GP (i.e., general performance) chopped carbon fiber having a fiber length of 0.7 millimeters and a fiber diameter of 18 micrometers and a fiber strength of 70 kg/mm$^2$;

25 percent by volume of coke powder having a particle size of 12 micrometers; and 25 percent by volume of coal-tar pitch having a particle size of 100 micrometers and a softening point of 270° C.

As described above, in the production of the carbon-fiber/carbon composite material, the method for the preparation of the molding compound according to which the mixture of carbon powder and pitch is alternately stacked with the carbon fiber layers is already known. However, it is technically very difficult to alternate the layers of the mixture of powders and those of the carbon fiber. Thus, even if a carbon-fiber/carbon composite material is produced according to this method on a industrial scale, the percentage of the carbon fiber in the product thus obtained does not exceed 40 percent by volume so that stable mass production of a carbon-fiber/carbon composite material having good physical properties such as bending strength, tensile strength, compression strength, shear strength, and abrasion resistance, which met the demands made upon high-quality products, could not be realized by this method.

Thus, according to one aspect of the present invention, the molding compound including pitch, carbon powder, and carbon fiber is prepared by the following steps.

First, the carbon powder and pitch powder are dispersed in a liquid. Then, carbon fiber in the form of cloth, for example, is immersed in the dispersion, so that carbon and pitch powders are caused to adhere to the carbon fiber. Next, the carbon fiber having the carbon powder and pitch thereon is withdrawn from the medium to be dried, and stacked upon one another to form a pile, thereby obtaining a molding compound in the form of a pile.

This method of preparing the molding compound which comprises pitch, carbon powder, and carbon fiber is based on the following new insights. Namely, if the carbon powder and pitch which are both in a fine powder form are dispersed in a medium which as good wetting property with these fine particles of carbon and pitch and also with carbon fiber, and if carbon fiber bodies are immersed in the dispersion so that the carbon fiber and the particles dispersed in the medium come into mutual contact, then, carbon fiber bodies to which the fine particles of carbon and pitch are adhered uniformly and densely can be obtained easily and reliably.

Furthermore, the carbon fiber bodies to which the carbon powder and the pitch powder are adhered have carbon fibers the surfaces of which are covered completely by the mixed powder of carbon and pitch. Thus, if sheets of these carbon fiber bodies are stacked together into a pile to obtain the molding compound, and if the molding compound in the form of a pile is molded by the application of heat and pressure and is carbonized or graphitized, a carbon-fiber/carbon composite material including a high percentage carbon fiber of high density and having good physical properties can be obtained easily and reliably, without such treatment for obtaining high density as pitch immersion or chemical vapor deposition, and without the laborious treatment of alternate stacking of carbon fiber and the mixed powder of carbon and pitch, which has hitherto been effected using a spatula, for example.

The carbon powder used in this method of preparing the molding compound including pitch, carbon powder, and the carbon fiber may be coke powder, carbon black, or graphite powder which have been used in conventional processes for producing carbon-fiber/carbon composite materials. The particle size thereof is not under specific limitations. However, because particle sizes exceeding 20 micrometers often result in the formation of cracks in the matrix of the molding constituted by the carbon and the pitch powder after the molding is subjected to the carbonization treatment, carbon powder having a particle size of not more than 20 micrometers is preferred. For example, carbon powder consisting of particles the majority of which fall within the particle size range of from 5 to 15 micrometers is preferred.

In this method or preparation of the molding compound, the pitch is also used as the binder, because the carbonization yields of pitch is higher than that of thermosetting resins and is thus advantageous. Furthermore, as pitch used as a binder which has a higher softening point renders higher yields of carbonization and thus results in a higher density carbon-fiber/carbon composite material, pitch having a softening point of not less than 200° C., and more preferably not less than 250° C., is preferred. The term "softening point" as used herein refers to the temperature at which the test material softens and deforms in the flow tester CFT-500 of Shimazu Co. to fill up the gaps in the test material particles. On the other hand, the binder pitch should be immersed into the filaments of the carbon fiber. Thus, the pitch is required to melt and become fluid during the heating process of molding. Therefore, the pitch is preferably one which has a fluidifying point. The term "fluidifying point" used herein refers to the temperature at which the test material begins to fluidify, and is usually from 20° to 40° C. above the softening point. From this latter point of view, a binder pitch including not less than 15 percent volatile matter is preferred. On the other hand, from the viewpoint of carbonization yields, a pitch including not more than 30 percent volatile components is preferred.

The pitch as specified above having a softening point of not less than 200° C. and showing a fluidifying point can be obtained, for example, from coal-tar pitch or petrolic pitch by a heat treatment at a temperature of not less than 350° C. under reduced pressure. The pitch is preferred to be crashed to a particle size of not more than 200 micrometers before the above-described method of preparation.

The carbon fiber used in the preparation of the molding compound according to this method may be any one of high-strength or low-strength carbon fiber products. The carbonization temperature thereof is not limited to a level which is not less than 1000° C., the usual carbonization temperature of the carbon fiber. Namely, a carbon fiber having a carbonization temperature of from 500° to 1000° C. suffices. Carbon fiber tends to contract when carbonized at a relatively low temperature within this lower temperature range during the carbonization of the molding, so that the difference in the contraction rate between the carbon fiber and the matrix of the molding become less conspicuous, thereby realizing a higher strength in the final product. Thus, carbon fibers having different carbonization temperatures can be selected according to the properties required of the product carbon-fiber/carbon composite material.

The carbon fiber may be of chopped or woven form, and is not subject to specific limitations with regard to its form. However, although the woven form of carbon fiber results in products which have higher strength in the alignment direction of the fiber of the fabric, the properties are highly anisotropic. Thus, for some applications, the chopped form of carbon fiber, which facilitate the mixture of the ingredient materials, is preferred.

The fiber diameter of the carbon fiber of this combination of ingredients is not under specific limitation. However, it is preferred to be from 5 to 20 micrometers. Furthermore, carbon fiber is usually bundled into a thread by a sizing agent such as an epoxy resin. However, if the carbon fiber is used together with the sizing agent, the sizing agent solidifies during the heating process to make the immersion of the pitch into the carbon fiber bundle difficult. Furthermore, the sizing agent result in the existence of foreign material on the interface between the pitch and the carbon fiber. Thus, it is preferred that the sizing agent be removed from the carbon fiber before the carbon fiber is mixed into the molding compound.

The dispersion medium used in this method of preparing the molding compound, in which the carbon and pitch powder are dispersed is selected from a liquid having a good wetting property with carbon and pitch powders and also with carbon fiber, such as acetone, ethanol, methanol, a water solution of a surface active agent, or a mixture thereof with a resin.

The weight ratio of carbon powder, pitch powder, and the dispersion medium is preferred to be 1:x:y, wherein x is within the range of from 0.2 through 4, and y is within the range of from 1 to 6. With this weight ratio of the powder and the medium, it is possible to produce moldings having a ratio of from 1:2 to 1:2.3 of matrix component (consisting of carbon powder and the pitch) and the carbon fiber.

A number of examples of the molding compound including pitch, carbon powder, and carbon fiber according to this method are given below.

(1) In this first example, carbon powder is obtained by smashing coke to a fine powder having a particle size range of from 5 to 19 micrometers. Pitch is obtained from coal-tar by heat treatment at a temperature of 430° C.; it has a softening point of 295° C. and a particle size of 100 micrometers. The mixture of these powders is dispersed in ethanol. The weight ratio of carbon powder, pitch, and ethanol is 5:5:20. Carbon fiber cloth, plain weave of 1000 filaments, having a strand strength of 350 kg/mm$^2$ and a modulus of elasticity of 23 t/mm$^2$, is cut into disk-shaped sheets having a diameter of 50 millimeters. The carbon fiber fabric sheets thus obtained are immersed in the dispersion medium of ethanol and, after the mixture of the carbon and pitch powder is adhered, is drawn up from the ethanol medium to be dried. 30 sheets of the carbon fiber fabric are stacked into a pile, thereby obtaining a molding compound in the form of a pile. The molding compound prepared according to this example is molded in a molding device similar to that of FIG. 2, but the inner diameter of the mold frame thereof is equal to 50 millimeters.

(2) In this second example, natural graphite smashed to a fine powder having particle sizes falling within the range of from 5 to 15 micrometers is used as the carbon powder. Pitch powder is obtained by treating decant oil at 450° C. in a vacuum of 20 mmHg for 60 minutes; it has the softening point of 310° C. The dispersion medium is prepared by mixing 70 percent by weight of ethanol and 30 percent by weight of phenol resin. The mixture of the graphite and pitch powder is dispersed in the dispersion medium, wherein the weight ratio of the graphite powder, pitch powder and the dispersion medium is 37:40. Carbon fiber in the form of a bundle or a strand of 6000 filaments of long fibers is immersed continuously through the dispersion medium. The carbon fiber has a strand strength of 350 kg/mm$^2$, and a modulus of elasticity of 23 t/mm$^2$. The strand of carbon fiber thus continuously immersed through the dispersion medium is densely wound around a drum having a diameter of 30 centimeters which rotates around its axis while oscillating in the axial direction. The density of the strand thus wound around the drum is 5 threads per 1 centimeter in the axial direction of the drum. The ethanol is removed from the carbon fiber strand thus wound around the drum by a drying process at 90° C. for 40 minutes, thereby obtaining a large sheet of one-directional carbon fiber. This large sheet of carbon fiber is cut into square sheets measuring 5 centimeters on a side, and the square sheets of carbon fiber thus obtained are stacked on one another into a pile of ten sheets so that the directions of the fibers are at right angles in adjacent sheets. This pile of carbon fiber sheets is molded by a molding device similar to that of FIG. 3, but having a mold whose inner square cross section measures 50 millimeters on a side.

(3) In this third example, a long strand of carbon fiber consisting of 6000 filaments and having a strand strength of 80 kg/mm$^2$ is continuously immersed in a solvent consisting of 30 percent by weight phenol resin and 70 percent by weight ethanol. It is then wound around a rotating drum as in the case of the second example. Next, the drum around which the carbon fiber thread has been wound is dried for 1 hour at 130° C., and the carbon fiber strand sheet is then removed from the drum. The carbon fiber strand sheet which has been obtained by the above procedure is cut into square sheets of 50 millimeters on a side. On the other hand, pitch having a softening point of 315° C. is obtained by heating, to 400° C. under a vacuum of 20 mmHg, coal tar to which 6 percent by weight of concentrated nitric acid has been added. Pitch powder is obtained therefrom by a smashing process to 200 mesh. Carbon powder having a mean particle size of 10 micrometers is obtained by the carbonization process of the oil coke at 1000° C. and subsequent smashing of the carbon into fine particles. Next, the pitch and carbon powders thus obtained are dispersed in a dispersion medium consisting of acetone, wherein the weight ratio of the carbon powder, pitch powder, and acetone is 3:1:5. The square sheets of carbon fiber obtained previously are immersed in the dispersion medium of acetone and drawn up therefrom to be dried. The one-directional sheets of carbon fiber to which the mixture of carbon and pitch powders is adhered are stacked upon one another so that the directions of the adjacent sheets lie at right angles to each other. 40 sheets of carbon fiber are stacked into one pile constituting the molding compound, which is molded by a molding device similar to that of FIG. 3, but having a mold whose inner cross section measures 50 millimeters on a side.

(4) In this fourth example, carbon powder is obtained by carbonizing oil coke at 1000° C. and then smashing the product to a particle size of 15 micrometers. Pitch having a softening point of 300° C., a fluidifying point of 340° C., and a particle size of not more than 125 micrometers is obtained by heating coal tar to 440° C. at a vacuum of 5 mmHg. 30 parts by weight of carbon powder and 70 parts by weight of pitch powder thus obtained are dispersed in a dispersion medium of 200 parts by weight consisting of ethanol. The carbon fiber fabric from which the sizing agent has been removed by acetone and which has been cut into squares of 95 millimeters on a side is immersed in the dispersion medium. The carbon fiber fabric is a plain weave of 1000 filaments and has a thread strength of 390 kg/cm$^2$. The square sheets of carbon fiber immersed in the dispersion medium are drawn up from the medium and dried on a metallic net having a mesh size of 1 centimeter. The total amount of adhered powder of carbon and pitch in the carbon fiber sheets thus obtained amounts to 95 parts by weight with regard to 100 parts by weight of the carbon fiber. The carbon fiber sheets were then stacked into a pile of 40 sheets and molded by a molding device similar to that of FIG. 3, but having an inner cross section of 100 millimeters on a side.

(5) In this fifth example, carbon powder having a particle size of 12 micrometers is obtained by carbonizing oil coke at 1000° C. and smashing the product thereafter by an oscillating ball mill. Pitch powder having a softening point of 300° C., a fluidifying point of 340° C., and a particle size of not more than 125 micrometers is obtained by heating coal tar to 430° C. and maintaining this temperature for 90 minutes 30 parts by weight of carbon powder and 70 parts by weight of pitch powder are dispersed in the 200 parts by weight of dispersion medium consisting of ethanol. Carbon fiber fabric square sheets measuring 9.5 centimeters per side and having a strand strength of 390 kg/cm$^2$ in the form of a plain weave of 1000 filaments from which the sizing agent has been removed by acetone are immersed in the dispersion medium, and then are dried on a metallic net having a mesh size of 1 centimeter. In the case of the carbon fiber sheets thus obtained, the ratio of carbon fiber to the total amount of powder of carbon and pitch adhered thereto is 100 parts to 95 parts by weight. The square sheets of carbon fiber are then stacked into a pile of 40 sheets, which is then molded by a molding device similar to that of FIG. 3, but having a square inner cross section of 100 millimeters on a side. The molding compound thus prepared is put into a molding device, and molded into moldings by the application of heat and pressure The structure of the molding device to be used in the molding process according to the present invention has already been described above referring to FIGS. 2 through 4. The molding process according to the present invention will now be described, taking the device of FIG. 2 as an example of the molding device The numerical values of temperatures, etc., given below refer to the case in which the molding has dimensions obtained by the device of FIG. 2, and the molding compound include pitch as the binder. First, the molding compound 4 is put into the mold constituted by the mold frame 1 and the upper and lower punches 2 and 3.

Next, the temperatures of the upper and lower punches 2 and 3 at the surfaces thereof in contact with the molding compound 4 are raised at a predetermined rate by the sheathed heaters 1a and 2a embedded therein to preheat the compound. The rate of temperature increase at this stage is preferred to be from 0.5° C. per minute to 20° C. per minute. At the same time, the molding compound 4 may be pressed by the press-heads 5 and 7 through the insulating members 7 and 8 and the upper and lower punches 2 and 3. The compressive force P against the molding compound at the first stage is preferred to be from 0 kg/cm² to 300 kg/cm².

When the contact surface temperatures of the upper and lower punches 2 and 3 reach a predetermined temperature at which the binder, i.e., the pitch or thermosetting resin melts and generates gas, they are preferably kept at that temperature for a predetermined length of time to ensure uniformity of temperature of the molding compound 4 along the thickness direction thereof. This temperature at which the contact surfaces of the upper and lower punches 2 and 3 are kept is preferred, in the case where pitch is used as the binder, to be in the range of from 350° to 450° C. In the cases in which a thermosetting resin is used as the binder, the preferred range is from 80° to 120° C. The length of time for which the temperatures of the contact surfaces of the upper and lower punches 2 and 3 are maintained depends on the dimensions and especially the thickness of the molding, and the length of time can be selected easily by those skilled in the art.

The compressive force P is increased from the initial value to a larger value when or before the contact surface temperatures of the upper and lower punches 2 and 3 reach the above-mentioned temperature at which the contact surface temperatures of the punches 2 and 3 are maintained for a certain length of time. This increased compressive force is preferred to be in the range of from 20 kg/cm² to 30 kg/cm².

After the preheating, the surface temperature of one of the punches 2 and 3, for example, the upper punch 2 is again raised at a predetermined rate to a temperature sufficiently high to cause curing or setting of the binder On the other hand, the surface temperature of the other punch, for example, the lower punch 3, is raised at a predetermined rate after being kept at the previous temperature level for another length of time, so that a predetermined temperature difference is created between the two surface temperatures of the upper and lower punches 2 and 3 in contact with the molding compound 4. In cases in which the molding has a greater thickness, the temperature rise in the inner portion of the molding becomes slow. Thus, in such cases, the temperature rise rate of the punch at the lower temperature side is preferred to be limited under a small value, lest the temperature of the molding at the lower temperature side become higher than the inner temperature of the molding. In the case in which the molding 4 has a thickness of not less than 10 millimeters and include pitch as the binder, the maximum temperature difference between the two contact surfaces is preferred to be not less than 40° C., and more preferably, to be not less than 120° C. The upper temperature limit to which the surface temperatures of punches 2 and 3 are raised is preferred, in the case in which the binder is pitch, to be from 450° to 600° C. In cases in which the binder is a thermosetting resin such as phenol resin, it is preferred to be from 150° to 220° C.

Figure 5:
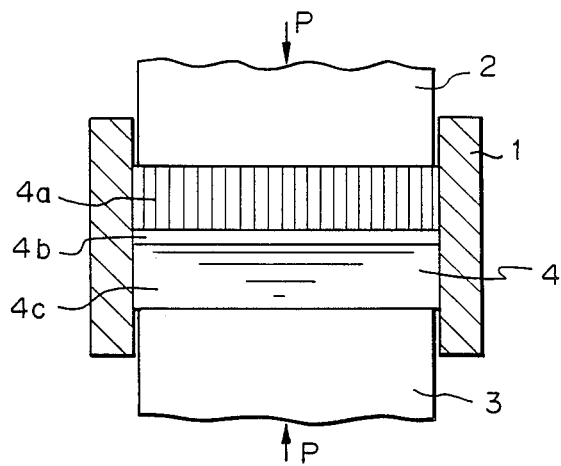
FIG. 5 is a view similar to that of FIG. 1, but showing the molding device of the present invention during the molding process.

FIG. 5 shows a section of the molding 4 at the stage at which the temperature difference is created between the contact surface temperatures of the upper and lower punches 2 and 3. Because a temperature gradient is created in the direction of the compressive force applied to the molding 4, the setting of the molding 4 advances in the direction of the compressive force, i.e., across the thickness of the molding 4, so that the molding is divided into three regions 4a, 4b and 4c. Namely, at the time which is illustrated in FIG. 5 the region 4a at the higher temperature side near the contact surface of the upper punch 2 is already setting. The region 4b next to the set region 4a is just before the setting stage and is highly viscous. The region 4c at the lower temperature side near the contact surface of the lower punch 3 is still in a molten state of low viscosity, and is actively generating reaction gas.

Thus, at the lower temperature side near the contact surface of the lower punch 3, a high viscosity region is not formed until the final stage of the setting of the molding compound 4 at which the setting of the molding compound is finished, so that the reaction gas generated in the melt region 4c of low viscosity can escape from the mold through the molten region 4c to the outside of the mold, and no accumulation of gas results.

After both the contact surface temperatures of the upper and lower punches reach the same temperature by elevating the temperature of the lower temperature side to the higher temperature, they are kept thereat for a predetermined length of time to ensure the completion of the setting of the molding compound 4. The length of time for which the punches 2 and 3 are kept at the higher temperature is preferred to be from 10 minutes to 180 minutes. After this, the contact surface temperatures of the upper and lower punches are lowered simultaneously to room temperature to cool the molding 4. The compressive force P is removed from the molding when the cooling of the molding begins, or when the surface temperatures of the punches 2 and 3 are reduced to a certain level. It is also possible to remove the compressive force P after the molding 4 is cooled to room temperature.

Figure 6:
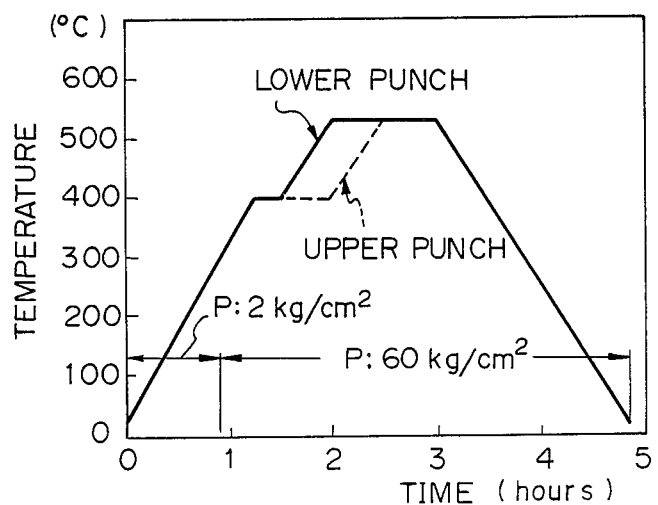
FIG. 6 is a graph showing a temperature pattern of a molding process according to the present invention together with the compressive force.
Figure 7:
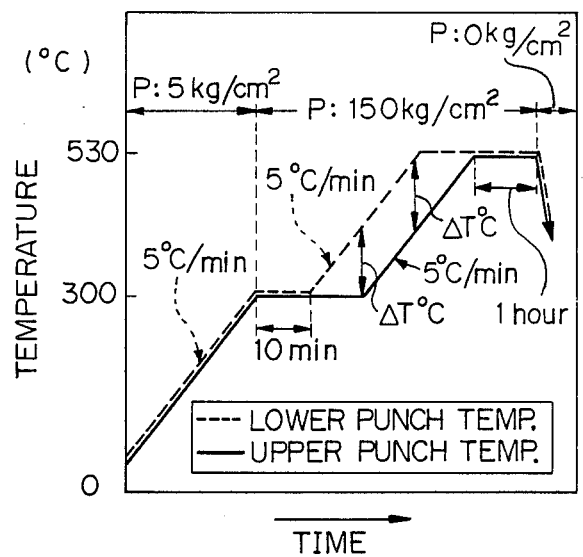
FIG. 7 is a graph similar to that of FIG. 6, but showing a temperature pattern of another example of the molding process according to the present invention.

FIGS. 6 and 7 show possible temperature patterns which may be adopted according to the present invention. The temperature pattern of FIG. 6 is followed in Example I, while that of FIG. 7 is followed in Example V as described hereinbelow.

As has been described hereinabove, the mold frame 1 of the devices of FIGS. 2 through 4 are preferred to be made of an INVAR-type alloy for the following reasons.

Figure 8:
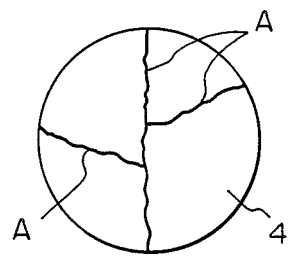
FIG. 8 is a top view of a molding in which cracks or fractures are formed in the direction of thickness thereof.
Figure 9:
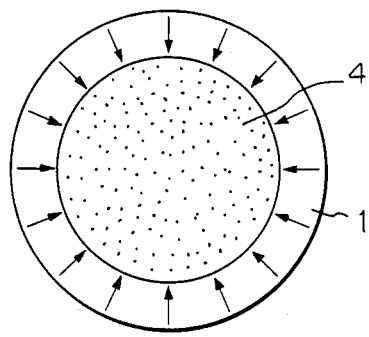
FIG. 9 is a schematic top view of a mold showing the forces which act against the molding.

When pitch is used as the binder of a molding compound which comprises not more than 10 percent by volume of fibrous materials, which reduces the reinforcing effect of the fibrous materials of the molding, it often happens that fractures develop which extend in the direction of the thickness of the molding, i.e., in the direction at right angles to the contact surfaces of the upper and lower punches 2 and 3 during the molding process Our research has revealed that these fractures A run from the outer circumference of the molding to the interior thereof and are caused by the splitting failure of the molding, as shown in FIG. 8. Thus, it is inferred that these fractures A in the molding 4 are caused by large compressive stresses acting locally on the circumference of the molding 4. Namely, as shown in FIG. 9, the difference in the contraction rate of the mold frame 1 and the molding 4 results in the compression of the circumference of the molding 4 by the contracting mold frame 1. (The arrows in FIG. 9 show the compressive force of the mold frame 1 against the molding 4.) Thus, a study of the mechanism of the formation of these fractures during the cooling of the molding revealed that the cause thereof is the greater rate of contraction of the mold frame 1 as compared with that of the molding 1 comprising pitch as binder during the cooling process of the molding.

More specifically, the molding compound 4 which has been molded by the application of heat and pressure as described above usually has a coefficient of linear expansion in the range of from $5 \times 10^{-6}$ to $8 \times 10^{-6}$ per degree centigrade. On the other hand, stainless steel or other common steel which has hitherto been used as the material of the mold frame 1 has a linear expansion coefficient ranging from $9 \times 10$ to $15 \times 10^{-6}$ per degree centigrade, which is greater than that of the molding 4. Thus, during the time in which the molding 4 is cooled from about 500° C. to room temperature, the mold frame 1 contract more than does the molding 4, which results in a great compressive force being exerted by the mold frame on the molding.

As the material of the mold frame 1, the inventors have tried various material. An example thereof was zirconia ($ZrO_2$), which has a linear expansion coefficient equal to $4.2 \times 10^{-6}$ which is smaller than that of the molding. A mold frame made of zirconia resulted in lesser degree of formation of the above-described fractures. However, it was not possible to completely suppress the formation of the fractures.

The reason why zirconia is unsatisfactory is as follows. In the case where the mold frame is made of zirconia, the linear expansion coefficient thereof is smaller than that of the molding. Thus, in principle, the contraction of the mold frame during cooling cannot produce compression of the molding. However, the molding is in the mold frame during the cooling process. Thus, the mold frame is cooled faster than the molding, so that the temperature of the mold frame becomes lower than that of the molding during the cooling process, which results in greater contraction of the mold frame than of the molding, thereby producing fractures in the molding.

Thus, it is inferred that in order to suppress such phenomenon, adoption of the materials having a still smaller linear expansion coefficient, such as graphite having a linear expansion coefficient of about $2 \times 10^{-6}$ per degree centigrade and carbon-fiber/carbon composite materials having a linear expansion coefficient of less than $1 \times 10^{-6}$ per degree centigrade, would be effective to prevent the formation of the above-described fractures.

However, carbon materials are oxidized and consumed in a molding temperature range above 500° C., which necessitates a gas sealing therefor by an inactive gas. This results in the molding device having a complicated structure. Furthermore, carbon materials as described above are low in toughness. Thus, they are not preferable as a material for the mold frame of the molding device.

INVAR alloy, on the other hand, is free of the above-mentioned disadvantages. Namely, the INVAR alloy which is preferred as the material for the mold frame for the molding of the molding including pitch as a binder is tough, virtually free of the problem of oxidation in a temperature range above 500° C., and has a small coefficient of linear expansion, so that there is no danger of causing fractures in the molding during the cooling process thereof.

Preferred examples of an INVAR-type alloy which is used as the material for the mold frame according to the present invention include 63.5Fe-36.5Ni, 63Fe-32Ni-5Co, and 36.5Fe-54Co-9.5Cr, because these INVAR-type alloys are metallic materials which are special for having an extremely low linear expansion coefficient ranging from 0 to $1.2 \times 10^{-6}$ per degree centigrade.

Conventional materials which have hitherto been used as the material of the mold frame are roughly divided into four classes: graphite (including carbon-fiber/carbon composite material), ceramics, stainless steel, and heat-resistant metals such as tungsten and titanium. The last three, i.e., ceramics, stainless steel, and heat-resistant metals have linear expansion coefficients exceeding $4 \times 10^{-6}$, which result in the formation of fractures during the cooling process. Thus, they are not preferred as the material for the mold frame when carbon fiber content of the molding compound is low. On the other hand, graphite is low in toughness and strength, and has the problems of oxidation, although some graphite materials have a linear expansion coefficient below the level of $2 \times 10^{-6}$ per degree centigrade. Thus, it is not preferred, either.

In the molding device of FIGS. 3 and 4, a clearance of 2 millimeters is sufficient to prevent the punches from being stuck in the mold frame. Namely, the difference in the contraction between the punches made of common steel having a linear expansion coefficient of about $15 \times 10^{-6}$ per degree centigrade and the mold frame made of INVAR having a linear expansion coefficient which is virtually negligible is, on the assumption that the diameters of the punches are 300 millimeters, equal to $300 \times 15 \times 10^{-6} (/°C.) \times 600(°C) = 2.7$ mm, so that a clearance of 2 millimeters on one side is sufficient. This clearance of 2 millimeters between the mold frame and the punches does not cause leakage of molding compound from the mold or any other problem.

Now, examples of the molding method according to the present invention will be described.

EXAMPLE I 20 kilograms of molding compound were prepared by mixing the following ingredients:

24 percent by weight coal tar pitch smashed to a particle diameter of not more than 100 micrometers and having a softening point of 230° C.; and 76 percent by weight of carbonized oil coke smashed to a particle diameter of not more than 20 micrometers.

In each instance of molding, 3 kilograms of the molding compound were molded into disk-shaped moldings having a diameter of 300 millimeters and a thickness of 20 millimeters by means of the molding device shown in FIG. 2. The molds of the molding device used in different instances of molding had the same dimensions: an outer diameter of 500 millimeters, an inner diameter of 300 millimeters, and a height of 100 millimeters. However, the molds were of three different materials, as explained later.

The pressure and heat pattern of the molding process was as follows.

FIG. 6 shows the temperature change curves of the upper and lower punches of the molding device at the surfaces thereof in contact with the molding compound, together with the pressure exerted by the upper and lower punches against the molding compound. First, the upper and lower punches 2 and 3 were heated simultaneously to 400° C. at a rate of temperature increase of 5° C. per minute and then kept at 400° C. for 10 minutes. Next, the lower punch 3 was heated from 400 to 520° C. at a rate of temperature increase of 4° C. per minute and was kept at 520° C., while the temperature of the upper punch was kept at 400° C. When the temperature of the lower punch reached 520° C., the upper punch was heated to 520° C. at a rate of temperature increase of 4° C. per minute. When the upper punch reached the upper temperature limit of 520° C., the temperatures of the upper and lower punches were kept thereat for 30 minutes. The upper and lower punches were cooled thereafter by stopping the heating of the punches by means of the heaters 2a and 3a.

The molding pressure P, on the other hand, was kept at 2 kg/cm$^2$ from the commencement of heating to the time at which the temperatures of the upper and lower punches 2 and 3 reached 300° C. After the temperatures of the upper and lower punches 2 and 3 reached 300° C., the molding pressure was raised to 60 kg/cm$^2$, and the molding pressure was maintained at this level during the cooling of the punches 2 and 3 and the molding compound 4.

The molds used in different instances of molding were of three different materials: common steel having a linear expansion coefficient of $14.6 \times 10^{-6}$; zirconia (ZrO$_2$) having a linear expansion coefficient of $4.2 \times 10^{-6}$; and 36.5Fe-54Co-9.5Cr stainless INVAR alloy having a linear expansion coefficient of $0.1 \times 10^{-6}$, respectively. As has been described above, INVAR is the preferred material for the mold of the molding device according to the present invention.

The moldings obtained by means of the mold made of common steel had numerous fractures therein. Those obtained by means of the mold of zirconia had 2 fractures. Those obtained by means of the mold made of the INVAR alloy had no fractures, and had a good outward appearance.

The molding obtained by means of the mold made of the INVAR alloy was heated to 1000° C. at a rate of 10° C. per hour in a nitrogen gas atmosphere and was kept thereat for 2 hours to be carbonized. Thereafter, the molding was heated to 2700° C. and was graphitized. The graphite disk thus obtained had a good outward appearance, a bending strength of 750 kg/cm$^2$, and a density of 1.87 g/cm$^3$.

EXAMPLE II

A molding compound was prepared by mixing the following ingredients:

30 percent by weight of coal tar pitch;

60 percent by weight of oil coke powder obtained by a process in which residua in petroleum refining, i.e., asphalt and pitch, were carbonized at 1000° C. and then smashed to an average diameter of 11 micrometers; and 10 percent by weight of chopped carbon fiber having a tensile strength of 70 kg/mm, a fiber diameter of 18 micrometers, and a fiber length of 0.7 millimeters.

The molding compound thus obtained was molded into plate-shaped moldings by means of the molding device shown in FIG. 3.

The molding processes were as follows.

In each instance of molding, 3 kilograms of the molding compound as specified above were poured into the heating and pressurizing mold of FIG. 3. While pressing the sample compound under a pressure of 5 kg/cm$^2$, the temperature of the punches at the surfaces thereof in contact with the molding compound was raised to 400° C. at a rate of 10° C. per minute, and was kept thereat for 10 minutes.

Next, increasing the pressing force against the molding compound to 100 kg/cm$^2$, the temperature of the lower punch 3 at the surface thereof facing the molding compound was further raised, in four different instances of molding, to 500° C., 510° C., 520° C., and 540° C., respectively, at a rate of 6° C. per minute, and the temperature were kept at these respective levels. The surface temperature of the upper punch 2 facing the compound 4, on the other hand, was kept at the previous temperature of 400° C. while the surface temperature of the lower punch was being raised.

When the surface temperature of the lower punch 3 facing the compound reached the upper temperature limit, the respective value of which in each instance of molding is specified above, the surface temperature of the upper punch 2 was raised to the respective upper temperature limit, corresponding to the upper temperature limit of the surface temperature of the lower punch, the rate of temperature increase also being 6° C. per minute. Thus, when both surface temperatures of the upper and lower punches reached the upper temperature limit, the surface temperatures thereof facing the compound were kept at the temperature limits for 30 minutes, at the end of which time the heating of the upper and lower punches was ceased. Next, when the surface temperatures of the upper and lower punches were lowered to 500° C., the pressing force against the formed compound was reduced to 0 kg/cm$^2$, and the punches 2 and 3 were subsequently cooled under no pressing force P.

The moldings thus obtained were in the form of rectangular plates having a thickness of 20 millimeters, a width of 300 millimeters, and a length of 300 millimeters. They had a good outward appearance.

Next the moldings obtained as described above were embedded in coke powder and were put into a carbonizing furnace. The moldings were heated in the furnace in a nitrogen gas atmosphere at the rate of 100° C. per hour from room temperature to 400° C., and then at the rate of 20° C. per hour from 400° C. to 1000° C. The temperature of the furnace was kept at 1000° C. for 5 hours, after which it was cooled.

The carbonized moldings, produced by the molding and carbonizing processes as described above, had good outward appearances and an excellent bending strength, which was not less than 800 kg/cm$^2$.

To compare the quality of the above examples according to the present invention with that of the moldings produced according to the prior art, a comparative example was also molded. The molding compound as specified above was molded utilizing the same molding device as that utilized in the molding of the examples. However, the heating and pressing pattern according to the prior art method was followed in the molding process.

More specifically, after 3 kilograms of the molding compound as specified above was poured into the mold, the upper and lower punches were heated, under a compressive force of 5 kg/cm$^2$, to 400° C. at the surfaces thereof in contact with the molding compound at a rate of 10° C. per minute and then kept thereat for 10 minutes. Thereafter, the compressive force was increased to 100 kg/cm$^2$, and the upper and lower punches were heated to 530° C. at the contact surfaces thereof at a rate of 3° C. per minute and kept thereat for 30 minutes. Then the heating of the upper and lower punches was stopped, and the compressive force was reduced to 0 kg/cm$^2$ when the contact surface temperature of the punches went down to 500° C. The molding was cooled thereafter without any compressive force.

The molding thus obtained according to the prior art method as described above had fractures in the middle portions thereof along its thickness, and was split into upper and lower halves.

EXAMPLE III

A molding compound was prepared by mixing the following ingredient materials:

28 parts by weight of petrolic asphalt pitch having a softening point of 200° C. and particle size of not more than 100 mesh;

36 parts by weight of alumina powder having a mean particle diameter of not more than 10 micrometers; and 240 parts by weight of soft steel fiber having a fiber length of 3 millimeters and a cross section measuring 50 micrometers × 50 micrometers.

The molding compound thus obtained was molded into plate-shaped moldings. The molding device utilized in the molding processes and the heating and pressing patterns thereof were identical with those of EXAMPLE II above. In each instance of molding, however, 10 kilograms of the molding compound were poured into the mold to obtain moldings of the same rectangular plate-like shape but having a slightly greater thickness: 23 millimeters in thickness, 300 millimeters in width, and 300 millimeters in length. All the moldings thus obtained had good outward appearances.

Next, the moldings were embedded in coke powder and were put into a carbonizing furnace. The moldings were heated in the furnace in a nitrogen gas atmosphere from room temperature to 1000° C. at a rate of 30° C. The temperature of the furance was kept thereat for 2 hours and was then cooled.

The carbonized moldings obtained by the carbonizing treatment as described above had good outward appearances without fractures, and had an excellent bending strength of 1400 kg/cm$^2$.

EXAMPLE IV

A molding compound was prepared by completely mixing the following ingredient materials:

1.5 kilograms of novolak, a phenol-formaldehyde type resin, in powder form containing 10 percent by weight of hexamine (hexamethylenetetramine); and 15 kilograms of iron powder having a particle diameter of 70 micrometers.

The molding compound was molded into a disk-shaped molding by means of a molding device like that shown in FIG. 2. The molding process was as follows.

The molding compound was first poured into the mold, and under a compressive force of 100 kg/cm$^2$, the upper and lower punches were heated to 105° C. at the surfaces thereof in contact with the molding compound at a rate of 3° C. per minute. After the contact surface temperature of the punches had been kept at 105° C. for 30 minutes, the compressive force against the molding compound was removed to effect degassing. Next, while the contact surface temperature of the upper punch was kept at 105° C., the contact surface temperature of the lower punch was raised to 190° C. at a rate of 2° C. per minute and was kept thereat.

When the contact surface temperature of the lower punch reached 190° C., that of the upper punch was raised to the same temperature, 190° C., at rate of 1° C. per minute, and was then kept thereat.

After the mold was kept in this state for 1 hour, the compressive force was reduced to 5 kg/cm$^2$, and the contact surface temperature of the upper and lower punches was raised to 200° C. at a rate of 1 degree centigrade per minute and then kept thereat for 2 hours. The punches and the molding therebetween were then cooled.

The molding obtained by the process as described above was disk-shaped with a diameter of 300 millimeters and a thickness of 27 millimeters, and had a good outward appearance without fractures.

EXAMPLE V

A molding compound was prepared by mixing the following ingredients:

70 percent by weight of coke powder having a particle diameter of 12 micrometers; and 30 percent by weight of coal tar pitch having a softening point of 300° C. and a particle diameter of 20 micrometers.

The molding compound thus prepared was molded into square-shaped moldings having the following dimensions:

160 millimeters in thickness, and 500 millimeters in width and length. The molding processes were effected by means of the molding device shown in FIG. 3. In each instance of molding, 20 kilograms of the molding compound were molded according to the heating and pressing pattern shown in FIG. 7, wherein the difference ΔT between the temperatures in contact with the molding compound at the setting stage of the pitch was varied from 0 to 120° C.

The contact surface temperatures of the upper and lower punches of the mold in which the molding compound had been poured were raised to 300° C. and kept thereat for 10 minutes. Thereafter, under a compressive force of 150 kg/cm$^2$, the contact surface temperature of the lower punch was raised to 530° C. at a rate of 5° C. per minute and then kept thereat. The contact surface temperature of the upper punch, on the other hand, was raised at a rate of 5° C. per minute when the contact surface temperature of the lower punch reached 300 plus ΔT° C., and, after reaching 530° C., was kept thereat for 1 hour together with that of the lower punch. The heating of the upper and lower punches was then stopped to cool both punches.

Next, the moldings were embedded in coke powder, and were heated in a carbonizing furnace in an argon gas atmosphere to 1000° C. at a rate of 10° C. per hour. The temperature of the moldings was kept thereat for 5 hours to carbonize the moldings.

The carbonized moldings were cut by a diamond cutter to conduct observation and evaluation of the cross-sectional surfaces of the moldings. The results of the observation and evaluation of the cross-sectional surfaces of the moldings corresponding to different values of ΔT in the heating pattern of the molding process were as follows:

Values of ΔT (° C.)
0: large laminar fractures were observed in the middle portion of the molding along the thickness thereof.
20: large laminar fractures were observed in the middle portion of the molding along the thickness thereof.
30: small laminar fractures were observed in the middle portion of the molding along the thickness thereof.
40: no fracture was observed.
80: no fracture was observed.
120: no fracture was observed.

The results tabulated above show that the generation of fractures in the moldings during the molding process can be prevented with certainty by creating a temperature difference ΔT that is greater than 40° C. On the contrary, generation of laminar fractures in the middle portion of the molding along the thickness thereof is inevitable if the temperature difference ΔT is less than or equal to 35° C.. Thus, in the case of this example, wherein moldings having a thickness of 50 millimeters were made of the molding compound as specified above, it can be concluded that the temperature difference at the end surfaces of the molding along the thickness thereof during the setting stage of the molding process is preferred to be not less than 40° C.

The carbonized molding corresponding to a temperature difference ΔT of 120° C. was graphitized by heating it to 2500° C. and keeping it thereat for 1 hour. The graphitized molding had a bending strength of 840 kg/cm².

EXAMPLE VI

A molding compound was prepared by mixing the following ingredients:
60 percent by weight of coke powder having a particle size of 20 micrometers; and
40 percent by weight of coal (from Miike Mine in Japan) smashed to a particle size of 100 micrometers.

Next, the molding compound thus prepared was molded by the molding device shown in FIG. 4 according to the method of the present invention as described below.

3 kilograms of the molding compound were poured into the mold of the molding device, and the upper and lower punches were heated to 410° C. at the surfaces thereof in contact with the molding compound, at a rate of 3° C. per minute under a compressive force of 80 kilograms. The contact surface temperatures of the punches were kept thereat for 30 minutes, and subsequently, the lower punch was heated to 540° C. at the contact surface thereof at a rate of 2° C. per minute, and was kept thereat. When the contact surface temperature of the lower punch reached 480° C., the upper punch was heated to 550° C. at the contact surface thereof at a rate of 5° C. per minute, and was kept thereat for 30 minutes. Thereafter, the upper and lower punches were cooled. When the temperatures of the upper and lower punches at the contact surfaces thereof fell to 500° C., the compressive force was removed from the molding.

The molding thus obtained showed dense sections without fractures.

Next, the molding was embedded in coke powder and heated to 1100° C. at a rate of 6° C. per hour in a nitrogen atmosphere so that the molding was carbonized.

The carbonized molding obtained by this carbonization process had a bending strength of 650 kg/cm² and a density of 1.52 g/cm³.

What is claimed is:

1. A method of molding a molding compound which contains pitch, wherein the pitch, when heated, melts with evolving gas and then sets or solidifies at a higher temperature, comprising the steps of:
   putting the molding compound into a mold;
   heating the molding compound under pressure at a temperature sufficient to cause the setting of the pitch wherein the molding compound is subject to a compressive force along a direction and the compound is heated on each of two ends which lie along the direction of the compressive force, whereby a temperature gradient is created along the direction of the compressive force, thereby progressively advancing the setting of said molding compound from one end of the molding compound which is at a higher temperature to the opposite end which is at a lower temperature;
   cooling the molding compound after the molding compound has been set; and
   removing the resulting molding from the mold.

2. A method as claimed in claim 1, wherein said molding compound comprises pitch and carbon powder.

3. A method as claimed in claim 1, wherein said molding compound comprises pitch, carbon powder, and carbon fiber.

4. A method as claimed in claim 1, wherein said molding compound comprises from 15 to 30 percent by volume of pitch.

5. A method as claimed in claim 1, wherein said molding compound comprises from 15 to 30 percent by volume of pitch and wherein said temperature gradient is created by heating said one end of the molding compound to a surface temperature of from 450 to 600° C. and said opposite end to a surface temperature at least 40° C. lower than said one end.

6. A method as claimed in claim 3, wherein the molding compound is prepared by dispersing carbon powder and pitch in a liquid medium; immersing carbon fiber in sheet form in the dispersion, thereby causing the carbon powder and the pitch to adhere to the carbon fiber; withdrawing the carbon fiber having the carbon powder and the pitch thereon from the dispersion; and stacking a plurality of sheets of carbon fiber thus treated in a pile to form the molding compound.

7. A method as claimed in claim 6, wherein said carbon fiber is in the form of a woven fabric.

8. A method as claimed in claim 1, wherein said molding compound comprises pitch, metal fiber, and graphite powder.

9. A method as claimed in claim 8, wherein said molding compound comprises from 15 to 40 percent by volume of pitch, from 5 to 50 percent by volume of metal fiber, and not less than 5 percent by weight of graphite.

10. A method as claimed in claim 8, wherein said molding compound further comprises at least one of ceramic powder, coke powder, and carbon fiber.

11. A method as claimed in claim 1, wherein said molding compound comprises pitch, metal fiber, and coke carbon powder.

12. A method as claimed in claim 5, wherein said temperature gradient is caused by a difference between the temperatures at the two end surfaces of not less than 120° C.

13. A method as claimed in claim 5, wherein said higher surface temperature is in the range of from 500° to 550° C.

14. A method as claimed in claim 1, which further comprises, prior to the heating step, the step of preheating the molding compound in the mold substantially uniformly at a sufficient temperature for a sufficient time to melt said ingredient.

15. A method as claimed in claim 14, wherein the preheating is carried out by heating the molding compound at a temperature between 350 and 450° C.

16. A molding device for molding a molding compound comprising:
a mold frame having a bore extending therethrough, said mold frame being made of an iron alloy having a linear expansion coefficient ranging from 0 to $1.2 \times 10^{-6}/C°$;
upper and lower punches slidably inserted in said bore of the mold frame;
means for pressing said upper and lower punches against a molding compound poured into a space in the bore limited by said upper and lower punches; and
means for heating said upper and lower punches, said means for heating comprising means for separately heating said upper and lower punches.

* * * * *